(12) United States Patent
Ngo et al.

(10) Patent No.: US 7,436,782 B2
(45) Date of Patent: Oct. 14, 2008

(54) FULL MESH LSP AND FULL MESH T-LDP PROVISIONING BETWEEN PROVIDER EDGE ROUTERS IN SUPPORT OF LAYER-2 AND LAYER-3 VIRTUAL PRIVATE NETWORK SERVICES

(75) Inventors: Chuong Ngoc Ngo, Ottawa (CA); Joël Réginald Calippe, Gatineau (CA); Thomas Vincent Flynn, Ottawa (CA); Andre Neil Dominic Jacob, Nepean (CA)

(73) Assignee: Alcatel Lucent, Paris (FR)

( * ) Notice: Subject to any disclaimer, the term of this patent is extended or adjusted under 35 U.S.C. 154(b) by 847 days.

(21) Appl. No.: 10/808,365

(22) Filed: Mar. 25, 2004

(65) Prior Publication Data

US 2005/0213513 A1  Sep. 29, 2005

(51) Int. Cl.
*H04L 12/28* (2006.01)
(52) U.S. Cl. ........................................ 370/254; 370/406
(58) Field of Classification Search ................. 370/392, 370/393, 395.1, 397, 254, 390, 408, 409; 709/213, 223, 227, 238
See application file for complete search history.

(56) References Cited

U.S. PATENT DOCUMENTS

| | | | |
|---|---|---|---|
| 6,789,121 B2 * | 9/2004 | Lamberton et al. ........... | 709/227 |
| 7,152,115 B2 * | 12/2006 | Ould Brahim et al. ....... | 709/238 |
| 7,260,097 B2 * | 8/2007 | Casey .......................... | 370/392 |
| 7,266,124 B2 * | 9/2007 | Kim et al. .................... | 370/397 |
| 2002/0097732 A1 * | 7/2002 | Worster et al. .............. | 370/408 |
| 2003/0018820 A1 * | 1/2003 | Ould-Brahim et al. ....... | 709/249 |
| 2003/0110268 A1 * | 6/2003 | Kermarec et al. ........... | 709/227 |

(Continued)

OTHER PUBLICATIONS

Xiao, Xi Peng, et al., Requirements for Pseudo-Wire Emulation Edge-to-Edge (PWE3), The Internet Society, Dec. 2003.

(Continued)

*Primary Examiner*—Huy D. Vu
*Assistant Examiner*—Abdullah Riyami (57) ABSTRACT

A network management system, and a method of, centrally provisioning a full transport LSP mesh and a full targeted LDP signaling session mesh in support of VPN services provisioning are provided. A network management system repository tracks Provider Edge nodes (PE) having label switch router functionality, transport LSP meshes and targeted LDP session meshes. The method includes selecting PE nodes for inclusion in a node group, identifying PE node pairs, and issuing commands to paired PE nodes to commission managed transport LSPs and targeted LDP signaling sessions. The advantages are derived from the full mesh LSP content transport provisioning and targeted LDP signaling session provisioning effected in a centralized network management context enabling service providers to: assure network resiliency, assure service quality, and provide accounting, in respect of Layer-2 and Layer-3 VPN services irrespective of client side deployed infrastructure while leveraging installed infrastructure in the service provider communications network core. Additional advantages are derived from increased operations management personnel productivity while reducing the probability of human error compared to manual provisioning thereof enabling wide availability of VPN services.

17 Claims, 8 Drawing Sheets

U.S. PATENT DOCUMENTS

| | | | |
|---|---|---|---|
| 2003/0154259 A1* | 8/2003 | Lamberton et al. | 709/213 |
| 2003/0174706 A1* | 9/2003 | Shankar et al. | 370/393 |
| 2003/0177221 A1* | 9/2003 | Ould-Brahim et al. | 709/223 |
| 2005/0129024 A1* | 6/2005 | Fisher et al. | 370/395.1 |
| 2005/0180431 A1* | 8/2005 | Kinoshita et al. | 370/397 |
| 2005/0220107 A1* | 10/2005 | DelRegno et al. | 370/392 |
| 2006/0080421 A1* | 4/2006 | Hu | 709/223 |
| 2007/0036162 A1* | 2/2007 | Tingle et al. | 370/392 |

OTHER PUBLICATIONS

Martini, Luca, et al., Encapsulation Methods for Transport of Ethernet Frames Over IP and MPLS Networks, The Internet Societ, Jul. 2002.

* cited by examiner

FULL MESH LSP AND FULL MESH T-LDP PROVISIONING BETWEEN PROVIDER EDGE ROUTERS IN SUPPORT OF LAYER-2 AND LAYER-3 VIRTUAL PRIVATE NETWORK SERVICES

FIELD OF THE INVENTION

The invention relates to network commissioning in a network management context. In particular to methods of provisioning full mesh Label Switched Path (LSP) connectivity between Provider Edge (PE) routers in support of Layer-2 Virtual Private Network (L2VPN) services such as Virtual Private Wire Services (VPWS) and Virtual Private LAN Service (VPLS).

BACKGROUND OF THE INVENTION

In the field of communications, service provider networks are undergoing consolidation due to market pressure to reduce telecommunication service provisioning overheads associated with maintaining multiple networks. In particular, there is a need to address cost/complexity issues related to provisioning Frame Relay (FR) services. Also, there is a need to address high bandwidth overheads incurred during content transport over Asynchronous Transfer Mode (ATM) infrastructure.

Internet Protocol (IP)/MultiProtocol Label Switching (MPLS)-based network provisioning enjoys an extensive deployment largely due to the availability of economic, high speed equipment suited for service-provider-side infrastructure deployment. IP/MPLS networks can support a variety of Layer-2 (L2) technologies; including Ethernet, ATM and FR.

Large organizations (customers) have multitudes of geographically displaced sites, which typically utilize Ethernet Local Area Network (LAN) infrastructure at each site. Traditionally, to provide L2VPN connectivity between these geographically displaced sites, FR services were used for inter-site connectivity between site-specific Customer Edge (CE) nodes because, FR technologies provide traffic differentiation and deterministic content transport. With the advent of IP/MPLS technologies, service providers can provide similar or better levels of Quality-of-Service (QoS) to the customer.

Service providers seek solutions for connecting their IP/MPLS networks with the customers' Ethernet infrastructure to provide low cost, efficient service offerings to customers, at a throughput comparable to traditional FR Virtual Leased Line (VLL) services and ATM services. However, unlike ATM and FR, plain vanilla Ethernet/IP content transport is performed in accordance with a broadcast/best-effort discipline in accordance with which packets propagate between source and destination nodes non-deterministically, and without guarantees, without necessitating infrastructure redundancy in conveying packets around failed infrastructure.

L2VPN services such as Virtual Private Wire Service (VPWS) and Virtual Private LAN Service (VPLS) can be provisioned over IP/MPLS networks.

VPWS coined by the Internet Engineering Task Force (IETF), generically refers to a L2VPN service that provides an Open Systems Interconnect (OSI) Layer-2 (link layer) point-to-point service (link emulation) connecting two CE nodes, associated with two corresponding customer sites, across a service provider's communications network. VPWS is also known as an Ethernet Virtual Private Line (EVPL) service if the source and destination network nodes are Ethernet based.

Figure 1:
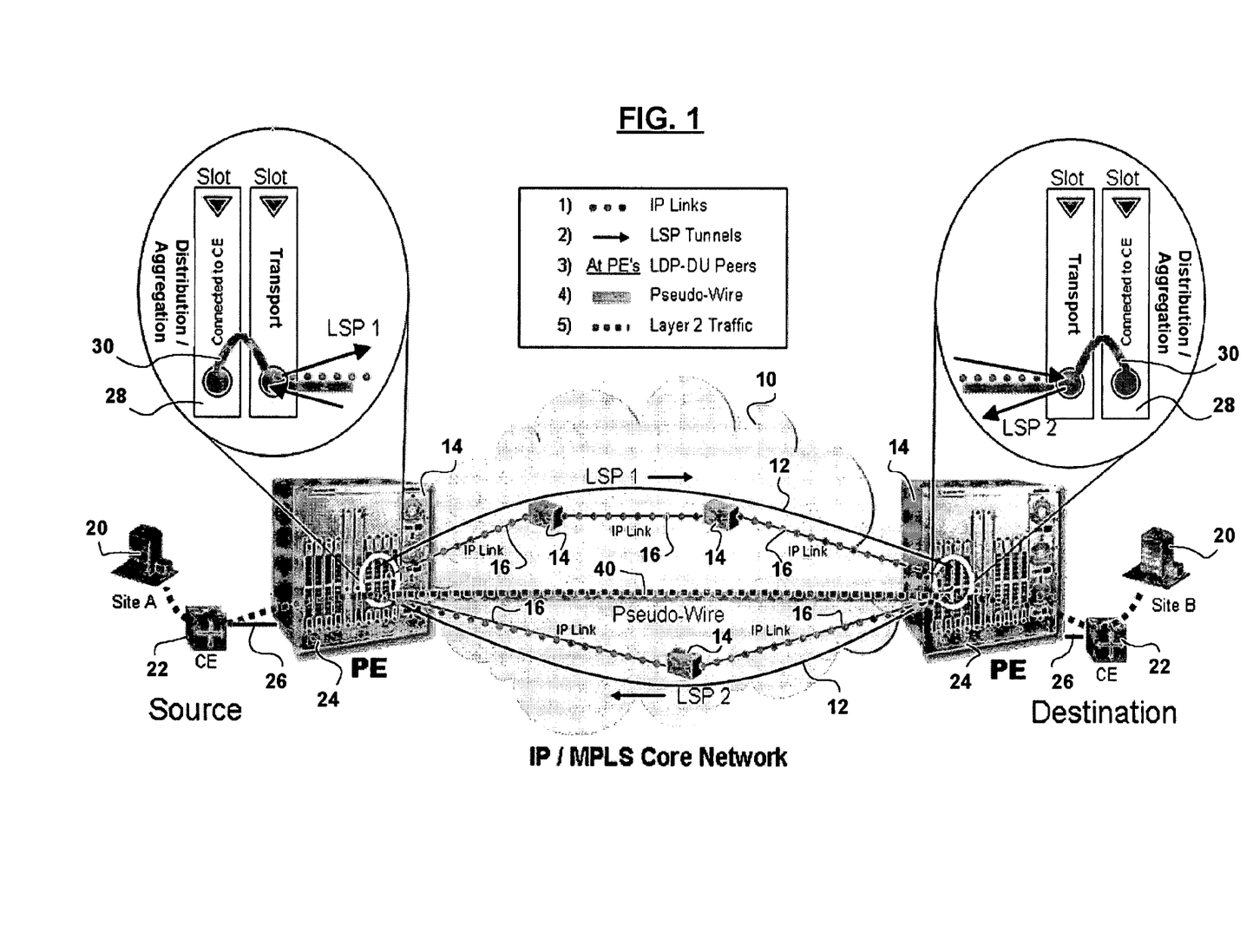
FIG. 1 is a schematic diagram showing an exemplary bi-directional pseudo-wire provisioned manually over a pair of label switched paths across a communications network.

To provide content transport in an IP/MPLS network 10, unidirectional Label Switched Paths (LSPs) 12 are created between multiple Label Switching Routers (LSRs) 14 as shown in FIG. 1. In order to provide deterministic content transport and quality-of-service support, source routed LSPs 12 must be established in accordance with a traffic engineering MPLS protocol such as Resource Reservation Protocol-Traffic Engineering (RSVP-TE).

The introduction of MPLS technology not only provides support for deterministic traffic content transport but also provides a migration path for service providers in support of convergence leveraging currently deployed infrastructure. A multitude of transport layer/link layer/physical layer protocols and infrastructure are compatible with MPLS in conveying content. As such, MPLS may be provisioned over IP links 16 themselves provisioned over: an IP/Ethernet infrastructure (GigE), a Packet Over Synchronous Optical NETwork (SONET) (POS) infrastructure, an Asynchronous Transfer Mode (ATM) infrastructure, etc. No physical layer details of the infrastructure of the communications network 10 are shown in FIG. 1 nor relevant as an abstraction thereof is made in employing MPLS technologies.

In accordance with customer content traffic differentiation techniques, CEs 22 associated with customer sites 20 connect to corresponding PEs 24 via respective Attachment Circuits (ACs) 26. Each AC 26 may be either a physical or a logical circuit provisioned in accordance with the installed communications network edge infrastructure in the aggregation/distribution portion of the communications network 10. PEs 24 multiplex customer traffic (30) onto corresponding L2VPN connection(s) 40 (a pseudo wire L2VPN connection is show).

A Pseudo Wire (PW) 40 refers to an emulated bi-directional point-to-point connection over a packet-switched communications network 10 providing connectivity between two remote network nodes 22 employing any OSI layer-2 technology allowing content traffic arriving an interface 28 of a PE switch 24 to be directed across the core of communications network 10 to a corresponding interface 28 on the corresponding peer PE 24. PW technology gets its importance from what it brings to customers by extending customer services across long distances. PW mechanisms provide emulation of the essential attributes of a selected service through a core communications network 10 of a different infrastructure (and transport technology). From a customer's point of view, a PW 40 acts as an unshared link or circuit of a particular service—each content frame conveyed by one CE 22 over the PW 40 is received by, and only by, the remote peer CE 22. Content frame forwarding via a PW 40 is not affected by the content frames themselves, rather defined by the end-to-end PW virtual circuit 40 to which the content frame is submitted for transmission.

In order to support PW 40 connectivity in an MPLS domain, a targeted LDP session must be established between corresponding PEs 24 enabling the exchange of MPLS labels. Each targeted LDP session includes an LDP signaling link configured with knowledge of remote-peer loopback address information at each end. Only a single targeted LDP session is allowed between any pair of PEs 24. Further information regarding PW and VPLS support is provided in draft-ietf-pwe3-requirements-08.txt, published by the Internet Engineering Task Force (IETF), specification which is incorporated herein by reference.

Therefore, to support any arbitrary PW 40 in a service provider's communications network 10, a full mesh of bidirectional LSP tunnels 12 and targeted LDP sessions need to be established between participating PE nodes 24. The targeted LDP sessions enable setting up PWs 40 over the full mesh of LSP tunnels 12 which carry the PW content traffic.

Currently, PW-using-LSP connectivity is provisioned manually. The problem is that tens, or even hundreds, of PE nodes 24 are typically employed in a particular service provider network 10 to provide customer services and therefore the number of fully meshed bi-directional LSP tunnels and targeted LDP sessions between N PE 24 nodes is in the order of N(N−1). Therefore manual setup provisioning is lengthy and error-prone. Also, once the full mesh is provisioned, manually adding or removing a PE node 24 is also time consuming and error-prone.

A prior art United States. Application publication number. 2003/0177221 A1 entitled "Resource Allocation Using an Auto-Discovery Mechanism for Provider-Provisioned Layer-2 and Layer-3 Virtual Private Networks" which was published on Sep. 18, 2003, describes a method in accordance with which, rather than manually configuring VPN tunnels at each PE router, the VPN Capability Discovery Information (VCDI) is "piggy-backed" onto auto-discovery information as an extension to a conventional information distribution protocol, such as Border Gateway Protocol (BGP), Domain Name Service (DNS), and RADIUS. In order to implement the proposed method, auto-discovery protocols have to be extended to include the transmission of the VCDI information. After receiving such information, a tunnel is established by, and between, the appropriate PE nodes based on the information. While the solution has merit, it requires that each PE implement the modified auto-discovery protocol. The requirement suffers from complex implications related to the fact that multi-vendor heterogeneous PE equipment is typically employed in a typical communication network infrastructure and therefore the proposed solution need be adopted by multiple vendors. While the multiple vendors may adopt such a solution eventually, there is no telling how fast the solution may be deployed as all PE equipment will need upgrading. Further, vendors may see no incentive in upgrading older PE equipment rendering it obsolete and thus preventing service providers from leveraging their existing infrastructure investment.

Therefore there is a need to solve the above mentioned issues in provisioning VPN services over a managed communications network.

SUMMARY OF THE INVENTION

In accordance with an aspect of the invention, a method of provisioning support for Virtual Private Network (VPN) services, centrally, in a network management context is provided. The method includes establishing a full transport mesh of bi-directional Label Switched Paths (LSPs) between a multitude of managed Provider Edge (PE) communications network nodes in a managed communications network, and establishing a full signaling mesh of targeted Label Distribution Protocol (LDP) signaling sessions between the multitude of PE communications network nodes.

In accordance with another aspect of the invention, in establishing the full transport mesh, the method further includes further steps. A group of PE communications network nodes participating in the managed communications network is selected. Each selected PE communications network node has a Label Switched Router (LSR). A multitude of PE communications network node pairs is derived from the selected group of PE communications network nodes. And, transport LSP commissioning commands are issued to each PE communications network node in the group to establish an LSP in respect of each corresponding PE communications network node pair.

In accordance with a further aspect of the invention, prior to issuing LSP commissioning commands, the method includes further steps. A determination is made as to whether a managed LSPs already exist between pairs of PE communications network nodes in the group. A further determination is made regarding whether provisioning parameters associated with the discovered LSPs comply with corresponding transport mesh provisioning parameters. And, the discovered LSPs are conditionally included in the transport mesh if compliance exists.

In accordance with a further aspect of the invention, the method further includes steps of commissioning an additional LSP. A pair of PE communications network nodes is selected, and LSP commissioning commands are issued to each PE communications network node in the pair to establish an additional LSP therebetween.

In accordance with a further aspect of the invention, the method further includes steps of decommissioning a selected LSP. The two PE communications network nodes corresponding to the ends of the selected LSP are identified. A determination is made regarding whether content is being conveyed via the selected LSP in respect of an actively provisioned VPN service. And, LSP decommissioning commands are selectively issued to the two PE communications network end nodes if no content is being conveyed via the selected LSP.

In accordance with a further aspect of the invention, the method further includes steps adding a PE communications network node to the group. A multitude of PE communications network node pairs is derived, each pair including the additional PE communications network node and one of the PE communications network nodes in the group. LSP commissioning commands are issued to the additional PE communications network node and each PE communications network node in the group, to establish an LSP corresponding to each PE communications network node pair determined.

In accordance with a further aspect of the invention, the method further includes steps removing a PE communications network node from the group. Provisioned LSPs terminating at the PE communications network node to be removed are identified. PE communications network nodes corresponding to the ends of the identified LSPs are also identified. A determination is made regarding whether content is being conveyed via the identified LSPs in respect of at least one actively provisioned VPN service. LSP decommissioning commands are selectively issued to corresponding PE communications network end nodes for each identified LSP if no content is being conveyed therethrough. And, the PE communications network node is excluded from the group if all identified LSPs have been decommissioned.

In accordance with a further aspect of the invention, the method includes further steps in establishing the full signaling mesh. A group of PE communications network nodes participating in the managed communications network is selected. A multitude of PE communications network node pairs is derived in respect of the selected PE communications network nodes in the group. And, targeted LDP session commissioning commands are issued to each PE communications network node in the group to establish a targeted LDP session in respect of each corresponding PE communications network node pair.

In accordance with a further aspect of the invention, prior to issuing targeted LDP commissioning commands, the method includes further steps. A determination is made as to whether managed targeted LDP sessions already exist between a pairs of PE communications network nodes in the group. And, discovered targeted LDP sessions are included in the signaling mesh.

In accordance with a further aspect of the invention, the method includes further steps in commissioning an additional targeted LDP session. A pair of PE communications network nodes is selected. A corresponding pair of interfaces may further be selected, each interface being associated with a respective PE communication network node in the pair. And, targeted LDP session commissioning commands are issued to each PE communications network node in the pair to establish the additional targeted LDP session therebetween.

In accordance with a further aspect of the invention, the method includes further steps in decommissioning a selected targeted LDP session. The two PE communications network nodes corresponding to the ends of the selected targeted LDP session are determined. A further determination is made as to whether signaling information is being conveyed via the selected targeted LDP session in respect of at least one actively provisioned VPN service. And, targeted LDP session decommissioning commands are selectively issued to the two PE communications network end nodes if no signaling information is being conveyed via the selected targeted LDP session.

In accordance with a further aspect of the invention, the method includes further steps adding a PE communications network node to the group. A multitude of PE communications network node pairs are determined, each pair including the additional PE communications network node and one of the PE communications network nodes in the group. Targeted LDP session commissioning commands are issued to the additional PE communications network node and each PE communications network node in the group, to establish a targeted LDP session corresponding to each PE communications network node pair determined.

In accordance with a further aspect of the invention, the method includes further steps in removing a PE communications network node from the group. Provisioned targeted LDP session terminating at the PE communications network node to be removed are identified. PE communications network nodes corresponding to the ends of the identified targeted LDP sessions are selected. A determination is made whether signaling information is being conveyed via identified targeted LDP sessions in respect of at least one actively provisioned VPN service. Targeted LDP session decommissioning commands are issued to the selected PE communications network end nodes of no signaling information is being conveyed via the identified targeted LDP sessions. And, the PE communications network node is excluded from the group if all identified targeted LDP sessions have been decommissioned.

In accordance with a further aspect of the invention, the method further includes a step of ascribing an identifier to one of: a transport mesh of LSPs, and a signaling mesh of targeted LDP sessions.

In accordance with a further aspect of the invention, the method further includes a step of: tracking one of: a transport mesh and a signaling mesh in a network management system repository.

In accordance with a further aspect of the invention, a network management system centrally provisioning full mesh MultiProtocol Label Switching (MPLS) connectivity in a managed communications network in support of Virtual Private Network (VPN) service provisioning is provided. The network management system includes a network management system repository tracking managed Provider Edge (PE) communications network nodes in the managed communications network, a full content transport Label Switched Path (LSP) mesh configuration and provisioning means for managing a multitude of content transport LSPs between a selected group of managed PE communications network nodes; and a full targeted Label Distribution Protocol (LDP) signaling session mesh configuration and provisioning means for managing a multitude of targeted LDP signaling sessions between the selected group of PE communications network nodes.

In accordance with a further aspect of the invention, the full content transport LSP mesh configuration and provisioning means includes a human-machine-interface.

In accordance with a further aspect of the invention, the full targeted LDP signaling session mesh configuration and provisioning means includes a human-machine interface.

In accordance with a further aspect of the invention, the network management system further includes one of: managed PE communications network node filtering means, and managed PE communications network node pair selection means.

In accordance with yet another aspect of the invention, the network management system further includes one of: LSP discovery means, targeted LDP session discovery means, and LSP parameter comparison means.

Advantages are derived from the full mesh LSP content transport provisioning and targeted LDP session provisioning effected in a centralized network management context enabling service providers to: assure network resiliency, assure service quality, and provide accounting, in respect of Layer 2 and Layer 3 VPN including, but not limited to, PW and VPLS services irrespective of client side deployed infrastructure while leveraging installed infrastructure in the service provider communications network core. Additional advantages are derived from increased operations management personnel productivity while reducing the probability of human error compared to manual provisioning thereof enabling wide availability of L2 and L3 VPN services.

BRIEF DESCRIPTION OF THE DRAWINGS

The features and advantages of the invention will become more apparent from the following detailed description of the exemplary embodiment(s) with reference to the attached diagrams wherein.

It will be noted that in the attached diagrams like features bear similar labels.

DETAILED DESCRIPTION OF THE EMBODIMENTS

In accordance with an exemplary embodiment of the invention, full mesh Label Switched Path (LSP) provisioning and full mesh targeted Label Distribution Protocol (LDP) session provisioning in a centralized network management context is provided.

Figure 2:
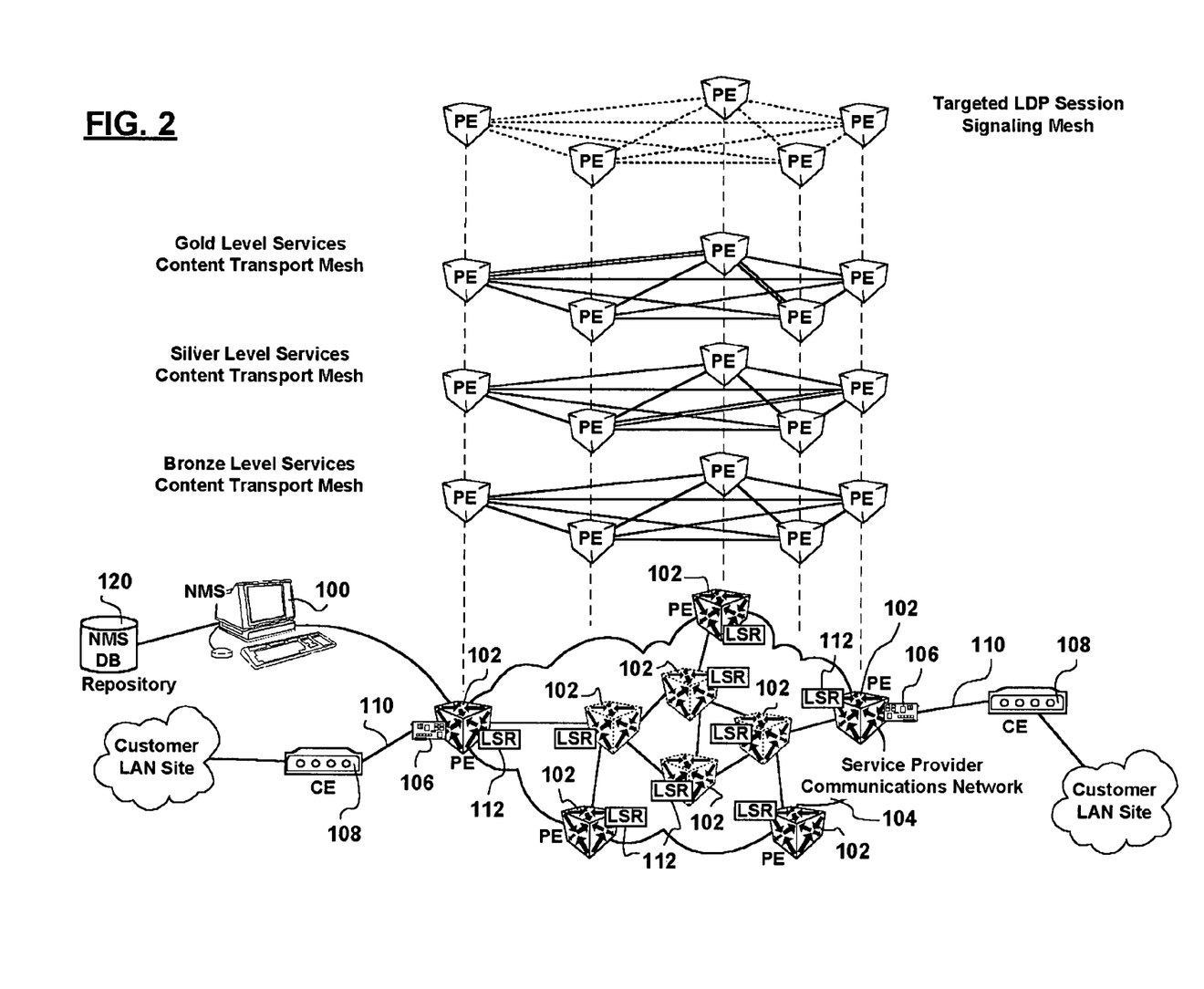
FIG. 2 is a schematic diagram showing, in accordance with an exemplary embodiment of the invention, a plurality of exemplary content transport full meshes of bi-directional label switched paths and an exemplary full mesh of targeted label distribution protocol signaling sessions.

In a network management context shown in FIG. 2, at least one Network Management System (NMS) 100 is employed to manage network entities, such as, but not limited to: communications network nodes 102 in a managed communications network 104. Communications network management is important particularly in view of complexities associated with typical service provider communications networks, regarding which the following relevant complexities are only exemplary:

Multi-vendor equipment is employed in a typical communications network 104. Multi-vendor equipment also includes multiple equipment types as well multiple versions of the vendor equipment running multiple versions of software/firmware.

Communications network nodes 102 may be typically classified by function and the manner in which the communications network nodes 102 are employed as part of the (installed) infrastructure of the communications network 104. It is important to keep in mind that each communications network node 102 may perform a variety of communications network functions. Typically communications network nodes 102 employed in a typical managed service provider network 104, are configurable multi-shelf devices which implement physical transport technologies and content transport protocols on interface cards 106, although monolithic network node devices 102 may also be employed.

Communications network nodes 102 connected to Customer Edge (CE) equipment 108 via physical access links 110 are referred to as Provider Edge (PE) communications network nodes. Communications network nodes 102 not connected directly to CE equipment 108 are known as core Provider (P) communications network nodes 102. It is understood that the flat communications network 104 representation shown in FIG. 2 is exemplary only, in practice communications network nodes 102, may act simultaneously as PE nodes 102 for some services and as core P nodes 102 for other services without any interference existing between the supported services.

It is important to keep in mind that typical communications network nodes 102 employed in service provider networks 104 simultaneously support a variety of physical transport technologies and content transport protocols. Some such communications network nodes 102, may also support MPLS content transport by implementing the MPLS protocol over the physical transport equipment installed therein (interface cards 106, switching back-planes, etc.) while other communications network nodes 102, are not aware of the MPLS content transport and are configured to simply switch content conveyed therethrough in accordance with the underlying content transport protocols supported which enable MPLS content transport on neighboring network node 102.

Each Label Switching Router (LSR) 112 is MPLS enabled and may be implemented either as a hardware device or implemented in software as a virtual LSR router instance. Either implementation of the LSR 112 represents a managed entity in the communications network 104.

The above mentioned complexities are addressed via communications network management. The above mentioned NMS 100 has an associated NMS repository 120 tracking managed entity information for the managed infrastructure of the service provider's communications network 104. As shown, the NMS repository 120 may include for example an NMS database without limiting the invention thereto.

In accordance with the exemplary embodiment of the invention, the functionality provided by the NMS 100 is augmented with centralized Layer-2 and Layer-3 VPN provisioning support.

Aside from cable and link setup, depending on the particular implementation, communications network nodes 102 managed in the network management context may have to be assigned Provider Edge (PE)/Provider (P) communications network node roles. Further, quality-of-service policies may have to be uploaded and activated on participating PE and P communications network nodes 102.

In accordance with the exemplary embodiment of the invention, the functionality of the NMS 100 is augmented with centralized full mesh LSP tunnel establishment means. In accordance with an exemplary full mesh LSP tunnel establishment method, operations management personnel selects a group of PE network nodes 102 to provision PW services therebetween for customer sites connected thereto, LSP tunnel commissioning commands are issued from the NMS 100 to each PE 102 in the group to effect the LSP tunnel establishment therebetween.

Figure 3:
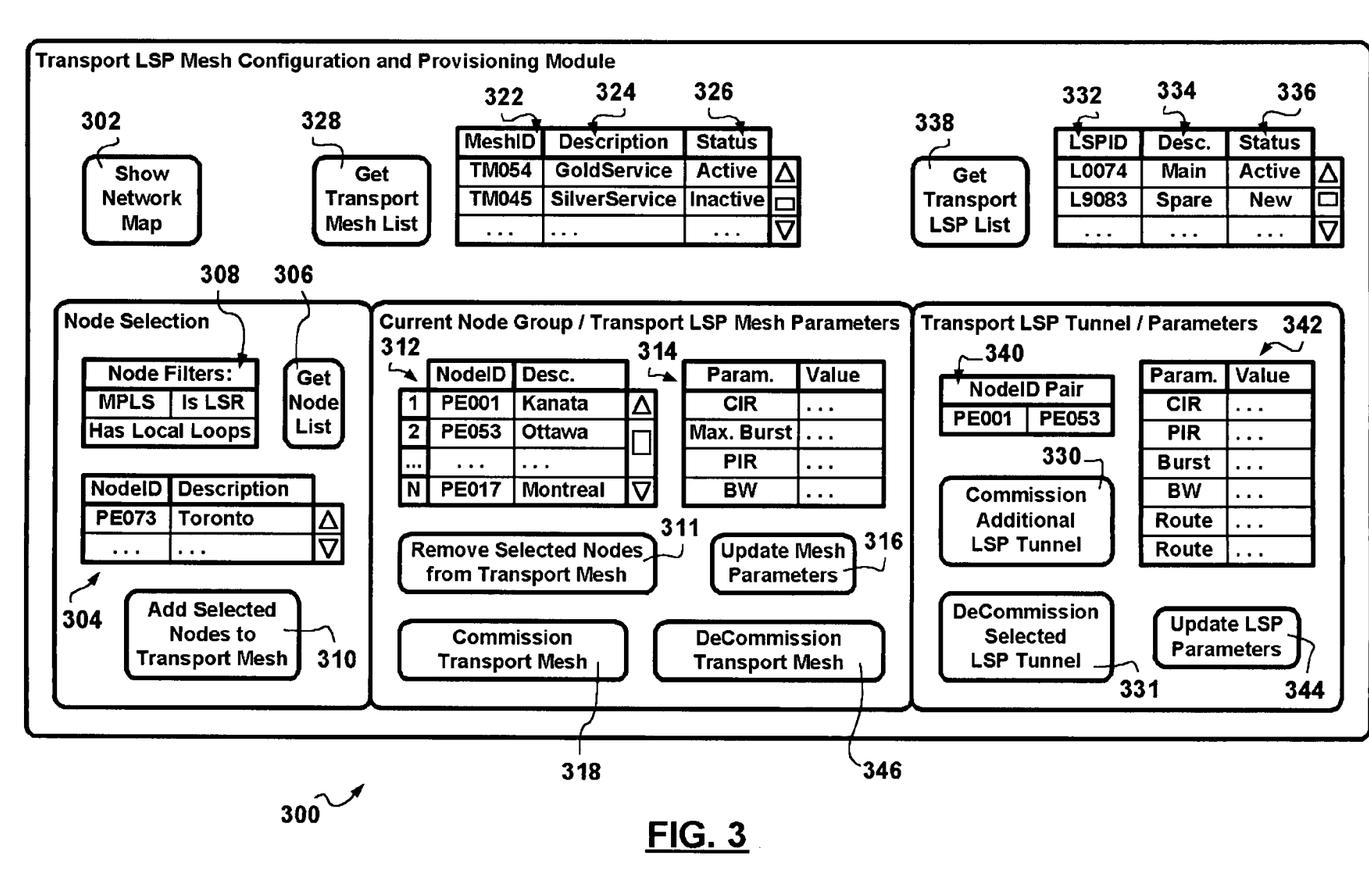
FIG. 3 is a schematic diagram of showing, in accordance with an exemplary implementation of the exemplary embodiment of the invention, a content transport label switched path mesh configuration module.

In selecting the group 312 of PE network nodes 102, operations management personnel, interacting with a Transport LSP Mesh Configuration Module 300 having an exemplary interface schematically shown in FIG. 3, may be provided with a stylized map of the managed communications network 104 by interacting with a Show Network Map button 302. The network map shows iconical representations managed network entities, from which PE network nodes 102 may be selected. In providing operations management personnel with the stylized map, the NMS 100 queries the NMS repository 120 for communications network nodes 102 (and logical positions thereof in the network).

The NMS 100 may further query the NMS repository 120 for a list 304 of communications network nodes 102, by interacting with a Get Node List button 306, to aid operations management personnel in selecting PE communications network nodes 102.

Alternatively, in selecting the group 312 of PE communications network nodes 102, having retrieved a list of communications network nodes 102, operations management personnel may be provided with filtering means 308 to identify PE communications network nodes 102 for inclusion 310 into the group 312 of PE network nodes 102.

In order for the transport LSP tunnels to be established between the PEs in the group, each PE communications network node 102 must also have LSR functionality. Having LSR functionality may be one of the selection criteria used in filtering as mentioned above (see "Is LSR" filter 308).

In ensuring quality-of-service in support of Service Level Agreements (SLA) in accordance with which VPN services are to be offered, LSP content transport tunnels may be commissioned to convey content therein in accordance with quality-of-service parameters 314 including, but not limited to: Committed Information Rate (CIR), Peak Information Rate (PIR), burst size, signaling protocol, tunnel bandwidth, etc. Quality of service parameters 314 may be specified and accepted by interacting with an Update Mesh Parameters button 316.

The details of centralized transport LSP tunnel commissioning are described elsewhere, suffice it to mention that, by interacting with a Commission Transport Mesh button 318, each LSR on a corresponding pair of PE network nodes 102 is instructed by the NMS 100 to establish LSP tunnels therebetween relieving operations management personnel of doing so manually. N*(N−1) unidirectional LSP tunnels are therefore commissioned in respect of each full content transport mesh in providing bi-directional content transport between N PE communications network nodes 102.

Figure 5:
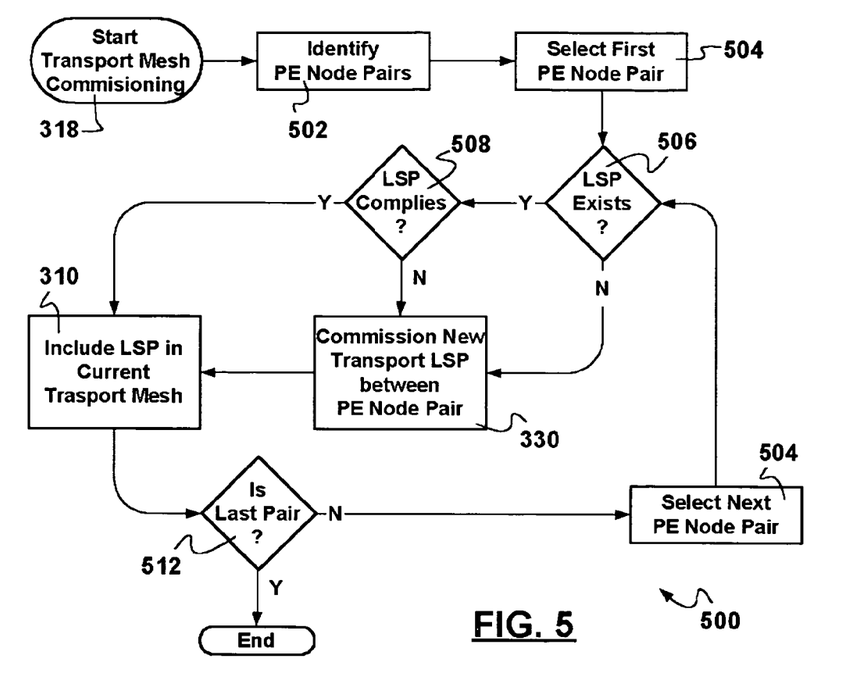
FIG. 5 is a schematic diagram showing, in accordance with another exemplary implementation of the exemplary embodiment of the invention, exemplary details of a content transport label switched path commissioning process.

It is possible for a content transport LSP tunnel to already be commissioned between a particular pair of PE network nodes 102 prior to full mesh LSP tunnel commissioning, the LSP tunnel already conveying content in accordance with the required transport LSP parameters 314. In accordance with an exemplary implementation of the exemplary embodiment of the invention, a process 500 of commissioning 318 an LSP transport mesh shown in FIG. 5, may include determining 506 whether LSP transport tunnels, themselves managed entities in the network management context, already exist between PE communications network node pairs 502 and, subject 508 to compliant LSP transport tunnel parameters, including 510 the existing LSP transport tunnels in the transport mesh being commissioned. An exemplary iterative (504, 512) process 500 is shown. Accordingly, the NMS full transport mesh commissioning means 300, further includes functionality for discovering 506 actively commissioned LSP content transport tunnels, and for determining 508 discovered LSP content transport tunnel adherence to a given set of LSP tunnel operational parameters.

In the following, LSP tunnel establishment between PE network node pairs is assumed, although in practice, depending on the signaling protocol employed, the path taken by content conveyed in respect of an LSP tunnel may vary in accordance with communications network conditions experienced thus providing resilience therein.

In accordance with the exemplary embodiment of the invention, the transport mesh of established LSP tunnels between a group 312 of PE communications network nodes represents a managed entity in the network management context. A transport mesh identifier 322 is associated with the transport mesh managed entity for further selection and reference, and a descriptive string 324 may be further associated with the managed transport mesh entity. A status 326 may be ascribed to the managed transport mesh entity and updated based on a multitude of related events. A Get Transport Mesh List button 328 is provided to query the NMS database 120 for transport mesh managed entities.

The Transport LSP Mesh Configuration and Provisioning module 300 may be employed to create different types of LSPs using LDP or RSVP for signaling providing a choice in creating E-LSPs conveying content traffic for multiple Classes-of-Service (CoS) or creating CoS specific L-LSPs.

Alternatively, depending on the implementation and/or details of a particular deployment in support of specific VPN services, multiple transport LSP tunnel full meshes may be commissioned between the same group 312 of PE network nodes 102. Multiple transport LSP tunnel full meshes may exemplary be commissioned to support different levels of service in accordance with a corresponding multitude of SLA agreements. Typically service providers provide three levels of service such as "gold", "silver", and "bronze", each level of service specifying different sets of full mesh transport configuration parameters 314 (burst size, bandwidth, etc.)

Individual PE communications network nodes 102 may be added 310 to or removed 311 from a PE group 312, as well additional LSP tunnels may be commissioned 330 between the PE network nodes 102 in the group 312, or decommissioned 331.

With each PE network node 102 addition 310 to an existing group of N PE network nodes 312, 2*N unidirectional LSP tunnels are commissioned between N pairs of PE network nodes: between the newly added PE network node 102 and the existing N PE network nodes 102 in the group 312. With each PE network node 102 removal 311 from an existing group of N PE network nodes 312, 2*(N−1) unidirectional LSP tunnels are decommissioned between N−1 pairs of PE network nodes: between the PE network node to be removed and the remaining N−1 PE network nodes 102 in the group 312.

The removal 311 of a PE network node 102 from the PE group may be conditional on the non-existence of any VPN services actively commissioned therethrough. The restriction condition may be further limited to VPN services terminating on the PE network node 102 to be removed 311, as the removed PE 102 may still convey content in respect of managed VPN services as an intermediary MPLS communications network node 102.

LSP transport tunnels also represent managed entities in the NMS management contest and are tracked in the NMS repository 120. Each LSP transport tunnel has an associated identifier 332, a description 334, and an status 336. The NMS repository 120 may be queried, dependent on the active network management context, by interacting with a Get Transport LSP List button 338. If the get transport LSP list button 338 is employed while a transport mesh is selected, then only the LSP transport tunnels of the selected transport mesh are displayed, otherwise all LSP transport tunnels are displayed. LSP tunnels commissioned in accordance with the exemplary embodiment of the invention are also ascribed identifiers and correspond to managed entities in the network management context. Naming conventions may be used in generating LSP tunnel identifiers 332. Selecting an LSP transport tunnel, the corresponding pair 340 of PE communications network nodes 102, and the LSP transport parameters 342 are displayed.

Within each provisioned VPN service, and therefore in respect of each full mesh of LSP tunnels, actual traffic patterns may be inhomogeneous between the PE communications network node pairs; additional LSP tunnels being necessary between particular pair of PE network nodes to convey all the traffic, as shown in FIG. 2.

The decommissioning 331 of an LSP transport tunnel may be made conditional on the non-existence of any VPN services actively commissioned therethrough. Updating 344 LSP transport tunnel parameters 342 may also be conditional on the non-existence of any VPN services actively commissioned through the corresponding LSP transport tunnel.

A selected transport LSP full mesh may be decommissioned by interacting with button 346. Decommissioning an transport LSP full mesh may be conditional on the non-existence of any VPN services actively commissioned therethrough.

Figure 4:
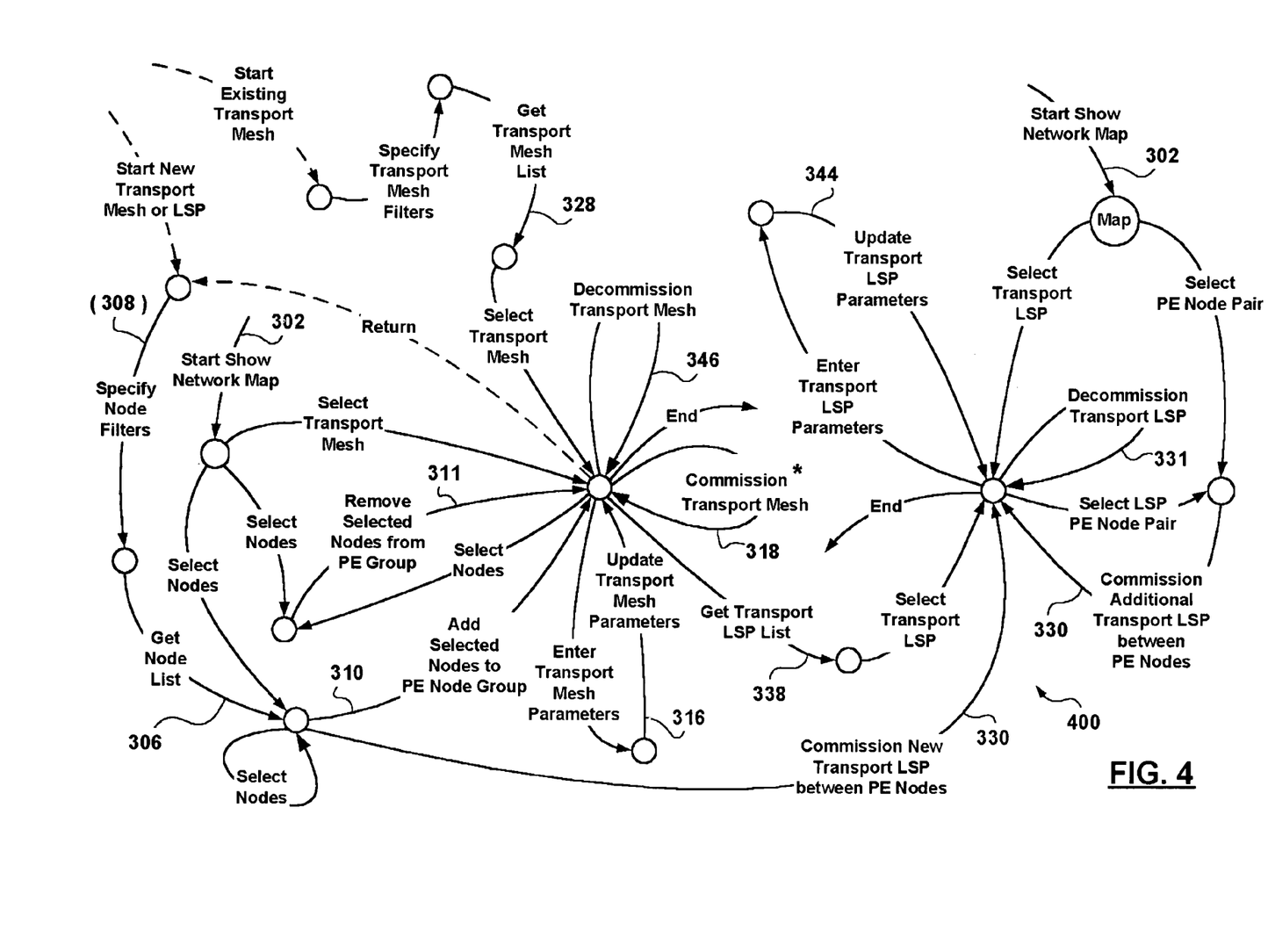
FIG. 4 is a schematic diagram showing, in accordance with the exemplary implementation of the exemplary embodiment of the invention, a state transition diagram corresponding to a content transport label switched path commissioning process.

FIG. 4 shows a state transition diagram corresponding to the full mesh transport LSP configuration and provisioning process described above.

Therefore the full mesh transport LSP configuration means described, hides the physical layer complexities of the communications network 104 and provides a content transport provisioning framework for a multitude of L2 and L3 VPN services.

In support of Pseudo-Wire (PW) and VPLS (L2VPN) service provisioning, signaling means must be provided between the group of PE network nodes 102 associated with a full transport LSP mesh to establish VPN connections therebetween. The signaling means includes targeted LDP sessions.

In accordance with the exemplary embodiment of the invention, the functionality of the NMS 100 is further augmented with centralized full mesh targeted LDP signaling session establishment means. Provisioned transport LSP meshes and targeted LDP signaling session meshes are provisioned independently and are used together to enable PW and VPLS service provisioning.

In accordance with an exemplary full mesh targeted LDP signaling session establishment method, operations management personnel selects a group of PE network nodes 102 to provision PW services therebetween for customer sites connected thereto, targeted LDP signaling session commissioning commands are issued from the NMS 100 to each PE 102 in the group to effect the targeted LDP signaling session establishment therebetween.

Figure 6:
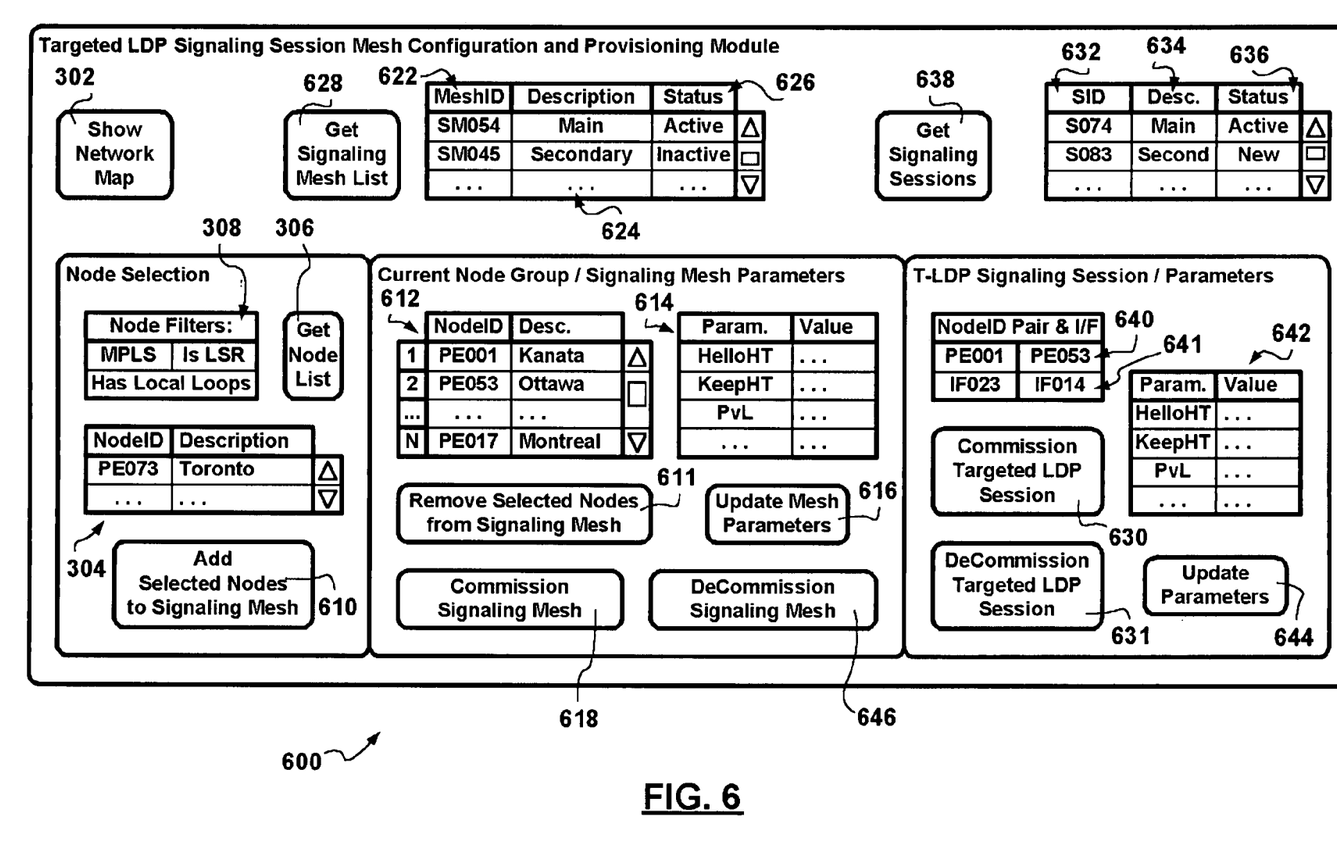
FIG. 6 is a schematic diagram of showing, in accordance with and exemplary implementation of the exemplary embodiment of the invention, a signaling label distribution protocol session mesh configuration module.

In selecting the group 612 of PE network nodes 102, operations management personnel, interacting with a Targeted LDP Signaling Session Mesh Configuration Module 600, having an exemplary interface schematically shown in FIG. 6, may be provided with a stylized map of the managed communications network 104 by interacting with a Show Network Map button 302 as describe above.

The NMS 100 may further query the NMS repository 120 for a list 304 of communications network nodes 102, by interacting with a Get Node List button 306 as described above.

Alternatively, in selecting the group 312 of PE communications network nodes 102, having retrieved a list of communications network nodes 102, operations management personnel may be provided with filtering means 308 to identify PE communications network nodes 102 for inclusion 610 into the group 612 of PE network nodes 102.

In order for the targeted LDP signaling sessions to be established between the PEs in the group, each PE communications network node 102 must also have LSR functionality. Having LSR functionality may be one of the selection criteria used in filtering as mentioned above (see "Is LSR" filter 308).

Targeted LDP signaling sessions may be commissioned to convey signaling information therein in accordance with signaling parameters 614 including, but not limited to: Hello hold-time, Keep hold-time, Path Vector Limit (Pvl), etc. Signaling mesh parameters 614 may be specified and accepted by interacting with an Update Mesh Parameters button 616.

By interacting with a Commission Signaling Mesh button 618, each LSR on a corresponding pair of PE network nodes 102 is instructed by the NMS 100 to establish targeted LDP signaling sessions therebetween relieving operations management personnel of doing so manually. (N*(N−1))/2 bi-directional targeted LDP signaling sessions are therefore commissioned in respect of each full signaling mesh in providing signaling information exchange between N PE communications network nodes 102.

Figure 8:
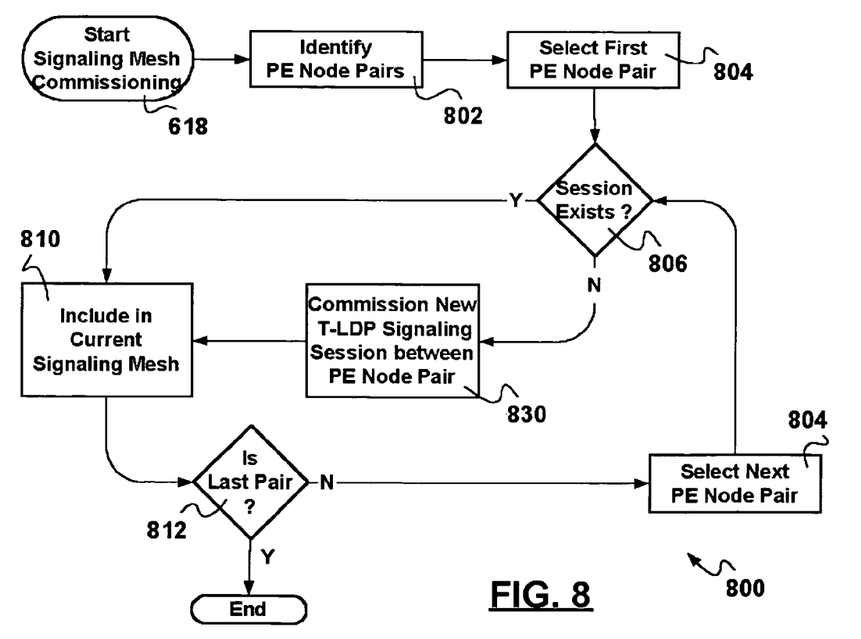
FIG. 8 is a schematic diagram showing, in accordance with another exemplary implementation of the exemplary embodiment of the invention, exemplary details of a signaling label distribution protocol session commissioning process.

It is possible for a targeted LDP signaling session to already be commissioned between a particular pair of PE network nodes 102 prior to full targeted LDP signaling session mesh commissioning, the targeted LDP signaling session already conveying signaling information. In accordance with an exemplary implementation of the exemplary embodiment of the invention, a process 800 of commissioning 618 a targeted LDP signaling session mesh shown in FIG. 8, may include determining 806 whether targeted LDP signaling sessions, themselves managed entities in the network management context, already exist between PE communications network node pairs 802 and including 810 the existing targeted LDP signaling sessions in the signaling mesh being commissioned. An exemplary iterative (804, 812) process 800 is shown. Accordingly, the NMS full signaling mesh commissioning means 600, further includes functionality for discovering 806 actively commissioned targeted LDP signaling sessions.

In the following, targeted LDP signaling session establishment between PE network node pairs is assumed, although in practice, the path taken by signaling information conveyed in respect of a targeted LDP signaling session may vary in accordance with communications network conditions experienced thus providing resilience therein.

In accordance with the exemplary embodiment of the invention, the full mesh of established targeted LDP signaling session between a group of PE communications network nodes 612 represents a managed entity in the network management context. A signaling mesh identifier 622 is associated with the full signaling mesh managed entity for further selection and reference, and a descriptive string 624 may be further associated with the managed signaling mesh entity. A status 626 may be ascribed to the managed signaling mesh entity and updated based on a multitude of related events. A Get Signaling Mesh List button 628 is provided to query the NMS database 120 for managed signaling mesh entities.

Depending on the implementation and/or details of a particular deployment in support of specific VPN services, multiple targeted LDP signaling sessions terminating on interfaces on PE communications network nodes may be commissioned between particular PE network node pairs.

Individual PE communications network nodes 102 may be added 610 to or removed 611 from a PE group 612, as well additional targeted LDP signaling sessions may be commissioned 630 between interfaces on PE network nodes 102 in the group 312, or decommissioned 631.

With each PE network node 102 addition 610 to an existing group of N PE network nodes 612, N bi-directional targeted LDP signaling sessions are commissioned between N pairs of PE network nodes: between the newly added PE network node 102 and the existing N PE network nodes 102 in the group 612. With each PE network node 102 removal 611 from an existing group of N PE network nodes 612, N−1 bidirectional targeted LDP signaling sessions are decommissioned between N−1 pairs of PE network nodes: between the PE network node to be removed and the remaining N−1 PE network nodes 102 in the group 612.

The removal 611 of a PE network node 102 from the PE group may be conditional on the non-existence of any VPN services actively conveying signaling information therethrough. The restriction condition may be further limited to VPN services terminating on the PE network node 102 to be removed 611, as the removed PE 102 may still convey signaling information in respect of managed VPN services as an intermediary MPLS communications network node 102.

Targeted LDP signaling sessions also represent managed entities in the NMS management contest and are tracked in the NMS repository 120. Each targeted LDP signaling session has an associated identifier 632, a description 634, and an status 636. The NMS repository 120 may be queried, dependent on the active network management context, by interacting with a Get Signaling Session List button 638. If the get signaling session list button 638 is employed while a signaling mesh is selected, then only the targeted LDP signaling sessions of the selected signaling mesh are displayed, otherwise all targeted LDP signaling sessions are displayed. Targeted LDP signaling sessions commissioned in accordance with the exemplary embodiment of the invention are also ascribed identifiers and correspond to managed entities in the network management context. Naming conventions may be used in generating targeted LDP signaling session identifiers 632. Selecting a targeted LDP signaling session, the corresponding pair 640 of PE communications network nodes 102, corresponding pair of interfaces 641, and the targeted LDP signaling session parameters 642 are displayed.

The decommissioning 631 of a targeted LDP signaling session may be made conditional on the non-existence of any VPN services actively conveying signaling information therethrough. Updating 644 targeted LDP signaling session parameters 642 may also be conditional on the non-existence of any VPN services actively conveying signaling information through the corresponding targeted LDP signaling session.

A selected full mesh of targeted LDP signaling sessions may be decommissioned by interacting with button 646. Decommissioning a full mesh of targeted LDP signaling sessions may be conditional on the non-existence of any VPN services actively conveying signaling information therethrough.

Figure 7:
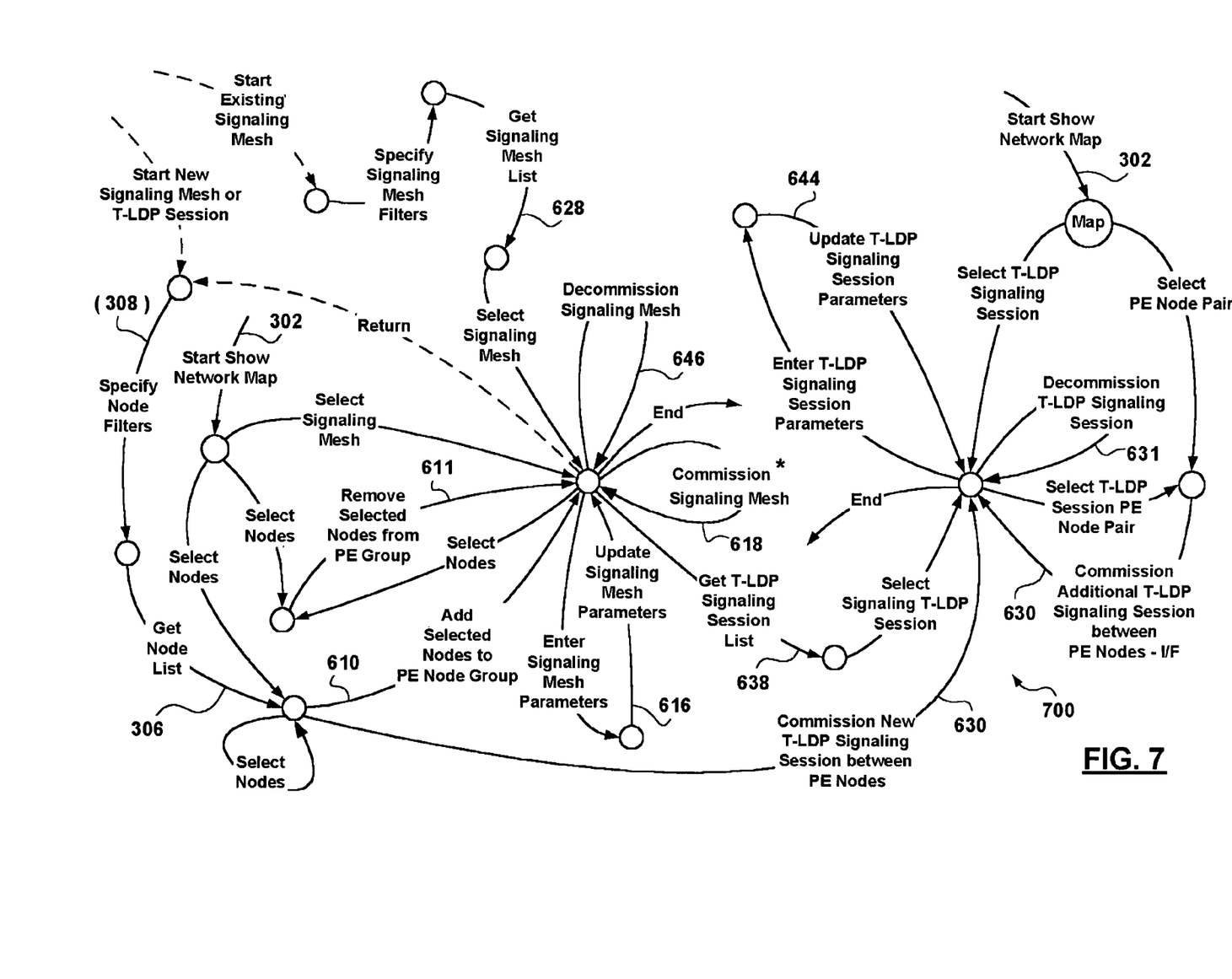
FIG. 7 is a schematic diagram showing, in accordance with the exemplary implementation of the exemplary embodiment of the invention, a state transition diagram corresponding to a signaling label distribution protocol session commissioning process.

FIG. 7 shows a state transition diagram corresponding to the full targeted LDP signaling session mesh configuration and provisioning process described above.

Therefore the full targeted LDP signaling session mesh configuration means described, hides the physical layer complexities of the communications network 104 and provides a signaling information transport provisioning framework for a multitude of Layer-2 and Layer-3 VPN services.

In accordance with the exemplary embodiment of the invention, the full mesh LSP content transport provisioning and full mesh targeted LDP signaling session provisioning effected in a centralized network management context enables service providers to: assure network resiliency, assure service quality, and provide accounting in respect of Layer-2 and Layer-3 VPN services irrespective of client-side deployed infrastructure while leveraging installed infrastructure in the service provider communications network core.

Further Layer-2 and Layer-3 VPN service provisioning details are provided herein below in respect of particular infrastructure employed.

In accordance with a VPWS services provisioning, Ethernet network interworking over MPLS is described.

In accordance with the exemplary embodiment of the invention, Layer-2 Ethernet packets are enabled to traverse an MPLS service provider communications network 104 connecting two serviced customer Ethernet LAN segments 20 together. Packets received on an exemplary ingress 1 Gb Ethernet (GigE) interface of a PE network node 102 and are transmitted out of the originating PE network node 102 via an MPLS capable interface, such as, but not limited to Packet over SONET (PoS), GigE, or ATM. Making reference to FIG. 9 two-deep MPLS label stack is employed as defined in IETF draft-martini-ethernet-encap-mpls-01.txt (draft-martini), which is incorporated herein by reference, where the inner label corresponds to the Layer-2 Ethernet connection and the outer label is used to forward MPLS encapsulated packets through the service provider communications network 104 onto the appropriate transport LSP/mesh. Label Distribution Protocol Downstream-Unsolicited (LDP-DU) signaled LSPs (S-LSPs) may be employed in provisioning the inner (label) LSP. RVSP-TE signaling is used to provision the outer (label) LSP. Labeled packets travel through the MPLS service provider communications network 104 to an MPLS capable interface (PoS, GigE, or ATM) to the egress PE network node 102. The packets then exit the egress PE network node 102 via a GigE interface and are conveyed to the destination customer Ethernet LAN segment 20.

Figure 9:
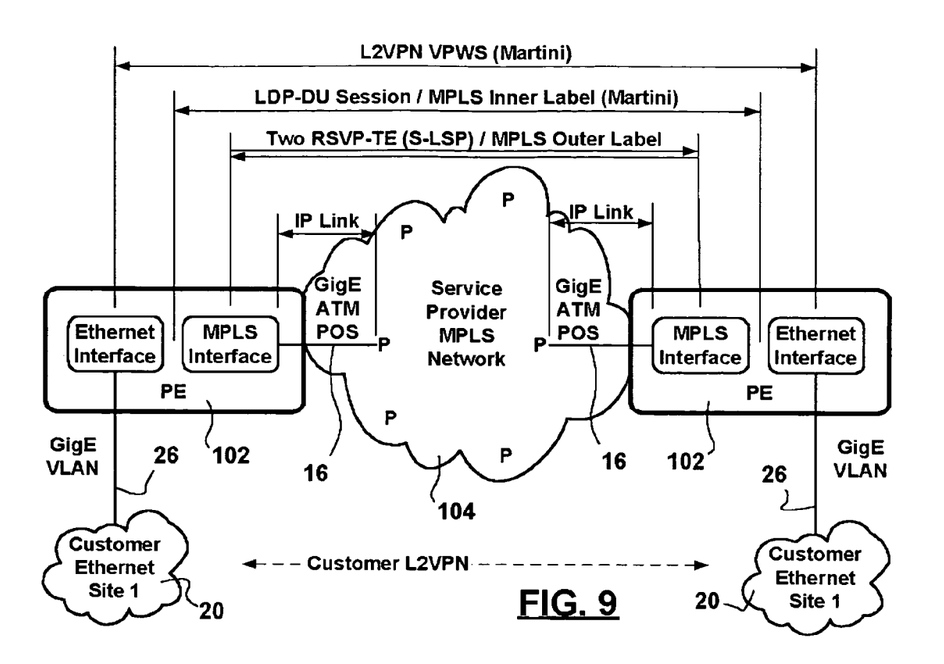
FIG. 9 is a schematic diagram showing Ethernet-based virtual private LAN service interworking over MPLS.

As described in draft-martini, a GigE port or VLAN interface is configured for network interworking, remote router, and Martini parameters. This initiates the signaling of the inner label through an LDP advertisement of the reachability of an Ethernet interface through an allocated MPLS label. When a match, of configured, Martini parameters is found between a configured interface and an advertised interface, the Layer-2 VPN connection may be configured and content traffic may be conveyed. All packets received on the ingress GigE interface are transported to the remote egress GigE interface.

In order for Ethernet VPWS connections to be made, a signaled MPLS tunnel must exist between the PE communications network nodes 102 that attach to the customer equipment 22. To establish a VPWS connection (pseudo-wire) over a signaled tunnel LSP, specific pseudo-wire configurations must be performed on both PE LSP routers 102.

When VPWS connections terminate at CE's 20 attached by dissimilar layer 2 technologies (e.g. ATM and GigE), the service offering requires conversion of packets from one Layer-2 technology to another, known as service interworking. This packet conversion or service interworking is performed at the PE network nodes 102 in the service provider's communications network 104.

Figure 10:
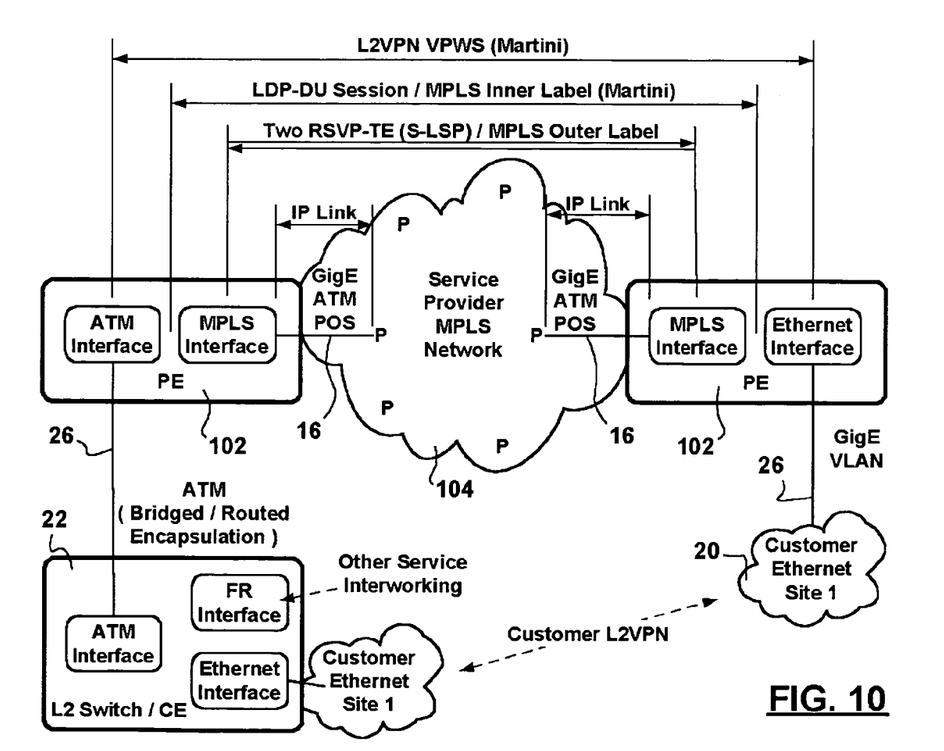
FIG. 10 is a schematic diagram showing hybrid ATM/Ethernet virtual private LAN service interworking over MPLS.

As technology advances and the cost of higher bandwidth Ethernet equipment become more economical compared to OC-3 and OC-12 ATM equipment. Existing point-to-point networking using ATM point-to-point services may be migrated to use 100 baseT and GigE interfaces at access point PE network nodes 12. As such, service interworking may offer a way to upgrade existing ATM point-to-point network support using VPWS, as shown in FIG. 10, creating a point-to-point pseudo-wires between ATM and GigE interfaces. Layer-2 Ethernet packets are enabled to traverse an MPLS service provider communications network 104 and connect to a Layer-2 PE switch 102 or CE router 22 supporting ATM. In order for Ethernet/ATM service interworking VPWS connections to be made, a signaled MPLS tunnel must exist. Also, the ATM Virtual Path Identifier/Virtual Connection Identifier (VPI/VCI) must be encapsulated using ATM Adaptation Layer-5 (AAL5).

Although, in the above extensive reference was made to PW services and L2VPN services in general, the invention is not limited thereto, implementations of the exemplary embodiment of the invention may also include provisioning support for Virtual Private Wire Services (VPWS) and Virtual Private LAN Service (VPLS), as well as Layer-3 VPN services.

Further the invention is not limited to any transport LSP type. A variety of transport LSPs may be employed including, but not limited to: Label Distribution Protocol LSPs, Resource Reservation Protocol-Traffic Engineering (RSVP-TE) LSPs, Labeled LSP, etc.

The embodiments presented are exemplary only and persons skilled in the art would appreciate that variations to the above described embodiments may be made without departing from the spirit of the invention. The scope of the invention is solely defined by the appended claims.

We claim:

1. A method of provisioning support for Virtual Private Network (VPN) services, centrally, in a network management context, the method comprising the steps of:
    establishing a full transport mesh of bidirectional Label Switched Paths (LSPs) between a plurality of managed Provider Edge (PE) communications network nodes in a managed communications network, the step of establishing the full transport mesh comprising:
        selecting a group of PE communications network nodes participating in the managed communications network, each PE communications network node comprising a Label Switched Router (LSR),
        deriving a corresponding plurality of PE communications network node pairs from the selected group of PE communications network nodes, and
        issuing LSP commissioning commands to each PE communications network node in the group to establish an LSP in respect of each corresponding PE communications network node pair;
    establishing a full signaling mesh of targeted Label Distribution Protocol (LDP) signaling sessions between the plurality of PE communications network nodes; and
    removing a PE communications network node from the group, the step of removing the PE communications network node comprising:
        selecting at least one provisioned LSP terminating at the PE communications network node to be removed,
        determining two PE communications network nodes corresponding to ends of the at least one selected LSP,
        determining whether content is being conveyed via the at least one selected LSP in respect of at least one actively provisioned VPN service,
        selectively issuing LSP decommissioning commands to the two PE communications network nodes corresponding to the ends of the at least one selected LSP when a determination is made that no content is being conveyed through the at least one selected LSP, and
        excluding the PE communications network node from the group if all selected LSPs have been decommissioned.

2. The method claimed in claim 1, wherein prior to issuing LSP commissioning commands, the method further comprises steps of:
    determining whether a managed LSP already exists between a pair of PE communications network nodes in the group;
    determining whether a provisioning parameter associated with the already-existing LSP complies with a corresponding transport mesh provisioning parameter; and
    conditionally including the already-existing LSP in the transport mesh if compliance exists.

3. The method claimed in claim 1, wherein commissioning an additional LSP, the method further comprises steps of:
    selecting a pair of PE communications network nodes from the group; and
    issuing LSP commissioning commands to each PE communications network node in the pair to establish the additional LSP therebetween.

4. The method claimed in claim 1, the method further comprising a step of adding an additional PE communications network node to the group, the step of adding the additional PE communications network node comprising:
    deriving a plurality of PE communications network node pairs, each pair including the additional PIE communications network node and one of the PE communications network nodes in the group; and
    issuing LSP commissioning commands to the additional PE communications network node and each PE communications network node in the group, to establish an LSP corresponding to each derived PE communications network node pair.

5. The method claimed in claim 1, wherein the step of establishing the full transport mesh further comprises
    issuing targeted LDP session commissioning commands to each PE communications network node in the group to establish a targeted LDP session in respect of each corresponding PE communications network node pair.

6. The method claimed in claim 5, wherein prior to issuing targeted LDP commissioning commands, the method further comprises steps of:
    determining whether a managed targeted LDP session already exists between a pair of PE communications network nodes in the group; and
    including the already-existing targeted LDP session in the signaling mesh.

7. The method claimed in claim 5, wherein the step of issuing targeted LDP commission commands further comprises:
    selecting a pair of PE communications network nodes from the group;
    optionally selecting a corresponding pair of interfaces, each interface being associated with a respective PE communication network node in the pair; and
    issuing targeted LDP session commissioning commands to each PE communications network node in the pair to establish the additional targeted LDP session therebetween.

8. The method claimed in claim 5, further comprising a step of decommissioning a selected targeted LDP session, the step of decommissioning comprising:
    determining two PE communications network nodes corresponding to ends of the selected targeted LDP session;
    determining whether signaling information is being conveyed via the selected targeted LDP session in respect of at least one actively provisioned VPN service; and
    selectively issuing targeted LDP session decommissioning commands to the two PE communications network end nodes when a determination is made that no signaling information is being conveyed via the selected targeted LDP session.

9. The method claimed in claim 5, further comprising a step of adding an additional PE communications network node to the group, the step of adding the additional PE communications network node comprising:
    deriving a plurality of PE communications network node pairs, each pair including the additional PE communications network node and one of the PE communications network nodes in the group; and
    issuing targeted LDP session commissioning commands to the additional PE communications network node and each PE communications network node in the group, to establish a targeted LDP session corresponding to each derived PE communications network node pair.

10. A method of provisioning support for Virtual Private Network (VPN) services, centrally, in a network management context, the method comprising the steps of:
   establishing a full transport mesh of bidirectional Label Switched Paths (LSPs) between a plurality of managed Provider Edge (PE) communications network nodes in a managed communications network, the step of establishing the full transport mesh comprising:
      selecting a group of PE communications network nodes participating in the managed communications network, each PE communications network node comprising a Label Switched Router (LSR),
      deriving a corresponding plurality of PE communications network node pairs from the selected group of Ph communications network nodes, and
      issuing LSP commissioning commands to each PE communications network node in the group to establish an LSP in respect of each corresponding PE communications network node pair;
   establishing a full signaling mesh of targeted Label Distribution Protocol (LDP) signaling sessions between the plurality of Ph communications network nodes;
   ascribing an identifier to one of: a transport mesh of LSPs, and a signaling mesh of targeted LDP sessions; and
   removing a PE communications network node from the group, the step of removing the PE communications network node comprising:
      selecting at least one provisioned LSP terminating at the PE communications network node to be removed,
      determining two PE communications network nodes corresponding to ends of the at least one selected LSP,
      determining whether content is being conveyed via the at least one selected LSP in respect of at least one actively provisioned VPN service,
      selectively issuing LSP decommissioning commands to the two PE communications network nodes corresponding to the ends of the at least one selected LSP when a determination is made that no content is being conveyed through the at least one selected LSP, and
      excluding the PE communications network node from the group if all selected LSPs have been decommissioned.

11. The method claimed in claim 10, further comprising a step of: tracking one of: a transport mesh and a signaling mesh in a network management system repository.

12. A network management system centrally provisioning hill mesh MultiProtocol Label Switching (MPLS) connectivity in a managed communications network in support of Virtual Private Network (VPN) service provisioning, the network management system comprising:
   a network management system repository tracking managed Provider Edge (PE) communications network nodes in the managed communications network;
   a full content transport Label Switched Path (LSP) mesh configuration and provisioning means for managing a plurality of content transport LSPs between a selected group of managed PE communications network nodes, the means for managing comprising:
      means for deriving a corresponding plurality of PE communications network node pairs from the selected group of PE communications network node, and
      means for issuing LSP commissioning commands to each PE communications network node in the group to establish an LSP in respect of each corresponding PE communications network node pair;
   a full targeted Label Distribution Protocol (LDP) signaling session mesh configuration and provisioning means for managing a plurality of targeted LDP signaling sessions between the selected group of PE communications network nodes; and
   a PE communications network node removing means for removing a PE communications network node from the selected group, the removing means comprising:
      means for selecting at least one provisioned LSP terminating at the PE communications network node to be removed,
      means for determining two PE communications network nodes corresponding to ends of the at least one selected LSP,
      means for determining whether content is being conveyed via the at least one selected LSP in respect of at least one actively provisioned VPN service,
      means for selectively issuing LSP decommissioning commands to the two PE communications network nodes corresponding to the ends of the at least one selected LSP when a determination is made that no content is being conveyed through the at least one selected LSP, and
      means for excluding the PE communications network node from the group if all selected LSPs have been decommissioned.

13. The network management system claimed in claim 12, wherein each PE communications network node in the group of managed PE communications network nodes comprises a Label Switching Router (LSR).

14. The network management system claimed in claim 12, wherein the full content transport LSP mesh configuration and provisioning means comprises a human-machine-interface.

15. The network management system claimed in claim 12, wherein the full targeted LDP signaling session mesh configuration and provisioning means comprises a human-machine interface.

16. The network management system claimed in claim 12, further comprising one of managed PE communications network node filtering means, and managed PE communications network node pair selection means.

17. The network management system claimed in claim 12, further comprising one of: LSP discovery means, targeted LDP session discovery means, and LSP parameter comparison means.

* * * * *